Oct. 14, 1958  M. F. STERNER ET AL  2,855,949
FUEL INLET VALVE AND FLOAT ASSEMBLY
Filed Aug. 15, 1955  3 Sheets-Sheet 1
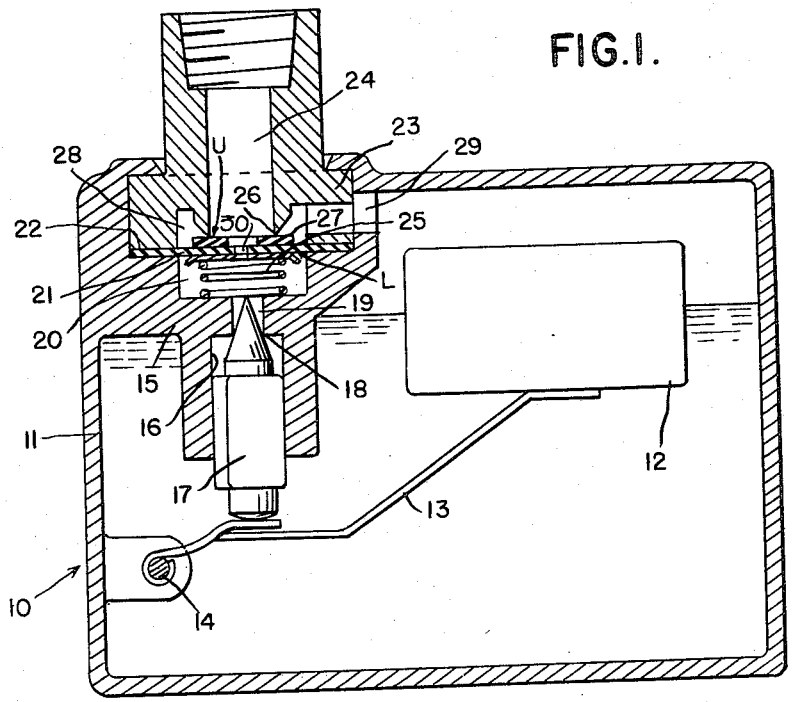
FIG.1.
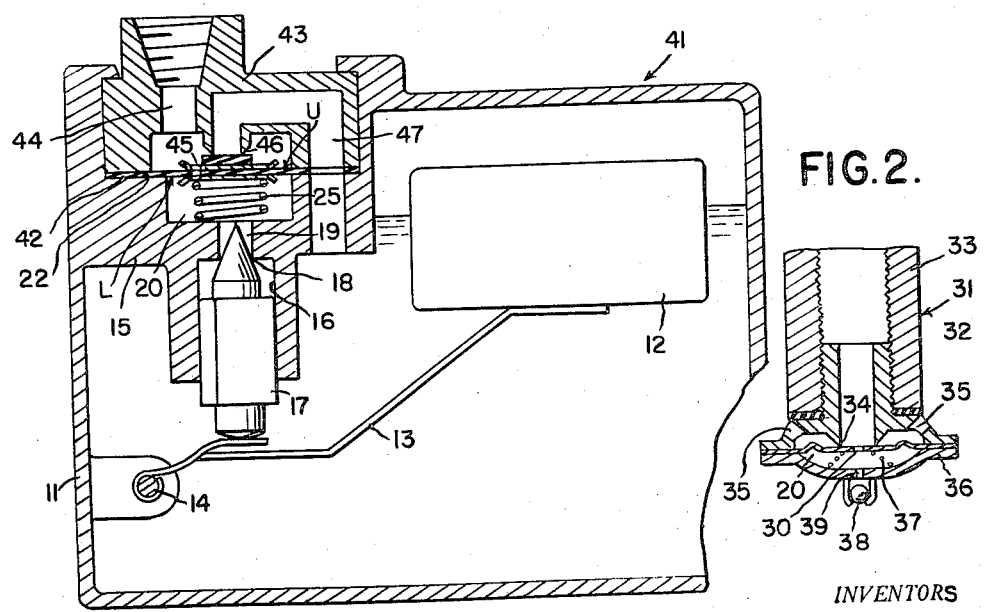
FIG.2.
FIG.3.
INVENTORS
MELVIN F. STERNER
ALBERT P. KAYSER
BY *Whittemore, Hulbert* 
*Belknap* ATTORNEYS

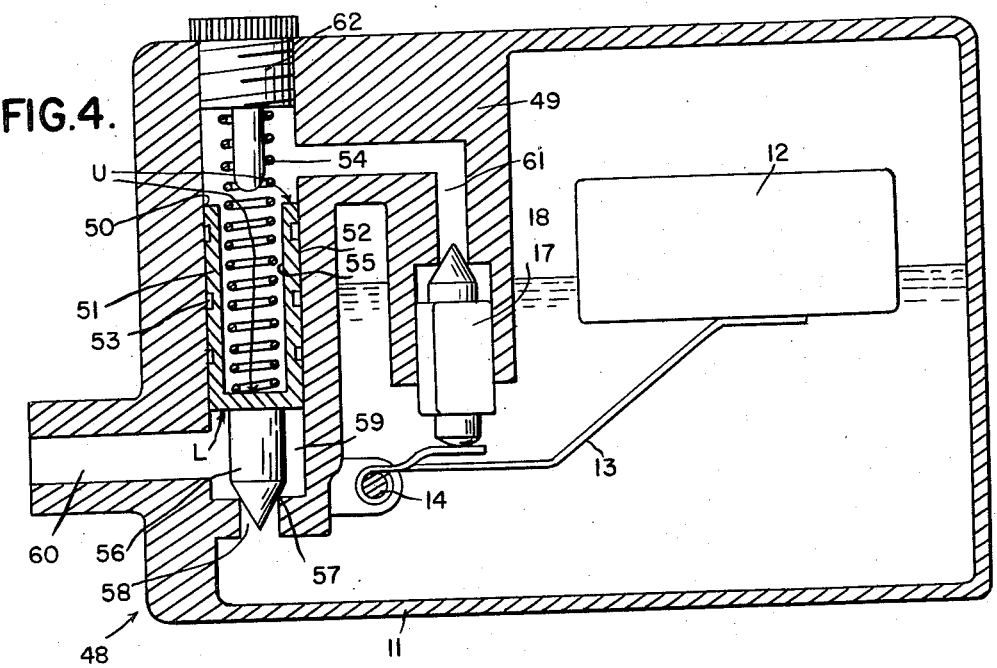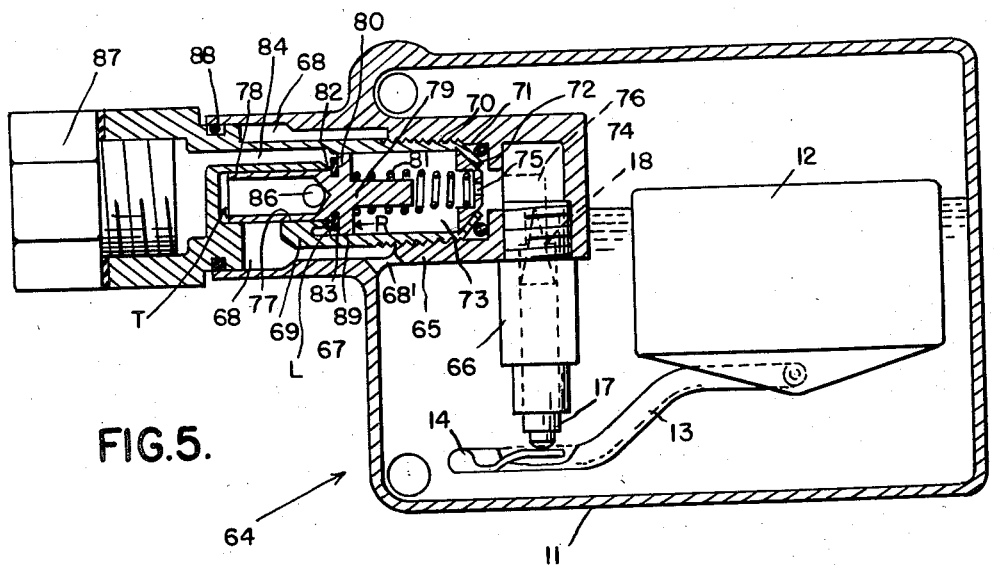

Oct. 14, 1958   M. F. STERNER ET AL   2,855,949
FUEL INLET VALVE AND FLOAT ASSEMBLY
Filed Aug. 15, 1955   3 Sheets-Sheet 3

INVENTORS
MELVIN F. STERNER
BY ALBERT P. KAYSER
Whitmore, Halbert
Belknap ATTORNEYS United States Patent Office 2,855,949
Patented Oct. 14, 1958

2,855,949

FUEL INLET VALVE AND FLOAT ASSEMBLY

Melvin F. Sterner, Bloomfield Hills, and Albert P. Kayser, Fraser, Mich., assignors to Holley Carburetor Company, Detroit, Mich., a corporation of Michigan Application August 15, 1955, Serial No. 528,197

2 Claims. (Cl. 137—414)

The present invention relates to an improved float controlled valve unit for the fuel inlet of a carburetor system. It is the primary objective of the invention to provide a float unit which will insure a substantially constant liquid level in a fuel float bowl under all operating conditions. As an example, the improved unit is particularly devised to offset the effect of a high inlet pressure to the float bowl under a static operating condition, as when the conventional fuel supply pump is not in operation, but still maintains pressure on fuel in the supply line to the bowl under the compression of its operating spring and the vapor pressure of the fuel at elevated temperatures.

Conventional intake needle valve and float units for the carburetion systems of internal combustion engines are subject to many shortcomings. These stem from inherent structural and operating characteristics of the unit and from unavoidable changes in operating conditions. The annular valve seat of the needle valve controlling the intake of fuel to a float bowl constitutes a restriction which limits the rate of fuel flow possible at any given pressure. Hence, at high flow rates, when the output pressure of the conventional fuel supply pump drops off, and also in the presence of a considerable amount of vapor when the liquid fuel is hot, the flow of fuel may well drop below operating requirements, thus, under-supplying the float vessel.

If, in an attempt to overcome this condition, the needle valve seat is enlarged, the effect is that the inlet fuel pressure works over a larger area, so that the requisite valve blow-off pressure is lowered. Thus, the fuel level in the float bowl is allowed to rise excessively, causing flooding, as a consequence of a high inlet pressure such as is commonly occasioned in the operation of the conventional carburetor system.

The irregularity may also be occasioned by variable factors in the manufacture or assembly of fuel system parts. For example, high inlet pressures may be built up during a heat soak or interval of distribution of engine heat to associated parts and supply lines, compounded or not by the above instanced static but still effective condition of the fuel pump. Again, an aggregative stack up of tolerances at the connections of various parts may well produce an unduly high pressure at the float intake needle valve, with the result mentioned above.

Any conventional approach in an effort to minimize these disturbing effects requires precise, close tolerance machining to provide for proper alignment and engagement of valve components, seating surfaces, edges, and the like; but despite all precautions a wide variation or range in the fuel level in the float bowl is still required in order to obtain a necessary range of fuel flow in the carburetor system.

The invention overcomes the objections noted above by affording an improved fuel inlet vave and float assembly which, in any of the various embodiments hereinafter described, is simple, economical and rugged in character, readily applicable to existing carburetion systems to greatly enhance their efficiency under all conditions of operation, static and dynamic. Generally considered, in accordance with the principle of the invention an auxiliary valve is arranged in the pressure fuel supply line at the intake to the float bowl. It is controlled in its operation to admit fuel under pressure to the bowl by a movable control member, which is spring-actuated to urge the auxiliary valve in a direction to close the bowl intake.

The control member may take the form of a flexible diaphragm, a plunger, or the like; and in accordance with the invention the fuel intake pressure is at all times in restricted communication either through or around the movable control member, with a control chamber partially defined by the latter. The pressure in the control chamber is variably relieved and reestablished in response to float-governed movements of a needle valve.

Thus, the pressure in the control chamber varies in proportion to needle valve movement, and only when this variable control chamber pressure, assisted by spring pressure acting on the control diaphragm or plunger, is overcome by the intake pressure on the auxiliary intake valve will the latter admit fuel to the float chamber.

The foregoing as well as other objects will be made more apparent as this description proceeds, especially when considered in connection with the accompanying drawings wherein:

Fig. 1 is a vertical sectional view of one embodiment of the improved unit;

Fig. 2 is a fragmentary view in generally similar section of a slightly modified form;

Fig. 3 is a fragmentary view in vertical section of a still further modification in accordance with the principle of Fig. 1, employing a diaphragm-type metering element;

Fig. 4 is a view in vertical section through a still further modified adaptation including a plunger control element; and Figs. 5, 6 and 7 are views in similar vertical section through still further modified and refined embodiments of the invention.

Figure 6:
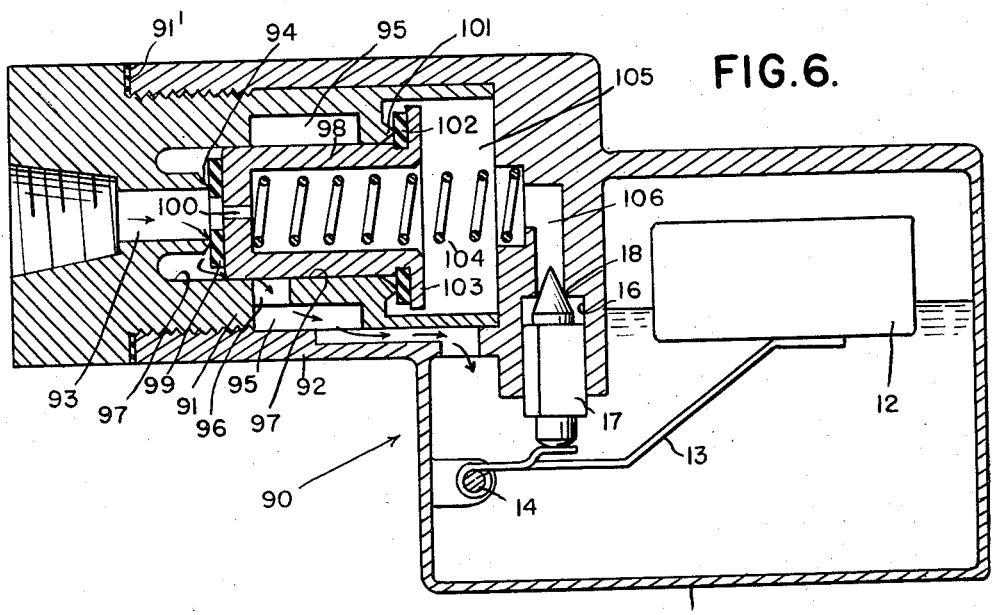

In view of the fact that the several alternative adaptations of the principle of the invention represented by Figs. 1 through 7, are constituted by parts which in many instances are common to more than one of the forms, corresponding reference numerals will be employed to designate corresponding parts and/or relationships, in the interest of simplicity, and repeated description of such parts and/or relationships will be avoided.

Referring first to Fig. 1 of the drawings, the reference numeral 10 generally designates a carburetor float unit employing a diaphragm type intake control in accordance with one embodiment of the invention. A float vessel or bowl 11 of conventional type is provided, within which a standard float 12 is pivoted by means of a float lever 13 on a fixed axis to a pin or like member 14 within the bowl. The bowl has an internal enlarged boss 15 which is machined to provide a downwardly opening, valve guide bore 16 slidably receiving a conventional needle valve 17. Valve 17 is engageable with an annular seat 18 at the lower extremity of an axial fuel inlet port or passage 19 in the boss.

The valve port 19 opens upwardly into a coaxial counterbored control chamber 20 of the improved unit 10, which chamber is partially defined by a circular auxiliary valve diaphragm 21 clamped against an annular upwardly facing land 22 surrounding control chamber 20 by a fuel intake fitting 23. An axial bore or intake passage 24 in fitting 23 is supplied with liquid fuel by a conventional engine fuel pump.

The control chamber 20 receives a coil compression spring 25 which acts upwardly against the lower face L of diaphragm 21 to urge the same for engagement with an annular valve seat 26 which is formed about the lower extremity of the intake passage 24. Diaphragm 21 is provided with a compressible sealing washer 27 on its upper face U to engage valve seat 26, which face is exposed to an annular valve discharge space or chamber 28 surrounding seat 26. A lateral discharge passage 29 communicates space 28 with the interior of float bowl 11, adjacent the top thereof.

The diaphragm 21 and its sealing washer 27 are apertured at 30 to provide a restrictive metering port of fixed small diameter, which restriction at all times communicates intake pressure passage 24 with the control chamber 20. In the embodiment of the invention illustrated in Fig. 1, this port is arranged coaxially of passage 24 and chamber 20. The force effective in a non-flow condition to seat diaphragm 21 is represented by the difference between the force of fluid inlet pressure on the lower diaphragm face L and the force acting on the upper face U within valve seat 26 plus the force of the predeterminedly compressed spring 25.

In the operation of the unit according to Fig. 1, liquid fuel is supplied under pressure in passage 24, the pressure being applied through restrictive port 30 to control chamber 20. The resultant upward force, plus the initial loaded force of spring 25, holds diaphragm washer 27 in closing relation to seat 26 in the static, non-flow condition. Upon removal of fluid from float vessel 11, the float 12 is repositioned, allowing a flow of fuel through the needle valve seat 18 into the float chamber. A proportionate drop of pressure in control chamber 20 results, due to the restrictive throttling action of its metering port 30, and this causes a force differential to be effective on diaphragm 21 in a direction to compress spring 25.

When the pressure differential relative to diaphragm faces U and L becomes sufficiently great and in the proper direction to adequately compress spring 25, the diaphragm 21 is forced away from seat 26 and fluid commences to flow through the latter and passage 29 to the float chamber. As the fluid level in bowl 11 rises, needle valve 17 assumes corresponding positions of closure, correspondingly restricting seat 18 until flow past the latter is shut off completely.

It is evident that the above construction avoids the irregularity of carburetor inlet control which is inherent in existing units under varying operating conditions tending to produce high inlet pressures. Diaphragm 21 closes communication between inlet passage 24 and the interior of float vessel 11 until the drop in level in the latter causes float 12 to drop and proportionately bleed control chamber 20, thus proportionately decreasing the net resistance of the diaphragm to downward opening movement. The unit thereby prevents an over-supply of fuel to bowl 11, due to high inlet pressure, which is actually uncalled for by the existing liquid level in the vessel.

The modified unit 31 of the invention illustrated in Fig. 2 of the drawings differs from that shown in Fig. 1, other than in unimportant differences in structural design, simply in that a ball type inlet control element is employed. A hollow inlet fitting 32 is threadedly mounted in an intake passage of a suitable pipe or connector 33 supplied under pressure from the fuel pump. Fitting 32 provides an annular, downwardly opening valve seat 34 surrounded by a valve chamber from which ports 35 open to the interior of a float chamber. A flexible diaphragm 21 provided with a central restrictive metering port or orifice 30 is clamped between an outer flange of fitting 32 and a coacting cap or head 36. Diaphragm 21 and head 36 define a control chamber 20 in the interior of which a conical coil spring 37 urges diaphragm 21 upwardly against seat 33. The head 36 supports a ball valve 38 which is urged upwardly by the buoyed float lever 13 into sealing relation to a central valve port 39 formed in head 36.

In the operation of the unit of Fig. 2, fuel pressure is exerted, in a static condition, on an area of diaphragm 21 equal to the area of the seat 34 engaged thereby, and fuel enters and pressurizes control chamber 20. When the fuel in the float bowl drops below a desired level the float 12 drops. This allows ball 38 to disengage port 39, reducing pressure in control chamber 20 proportionately due to restrictive action at diaphragm port 30. When the pressure in chamber 20 has dropped to an extent such that the force differential effective on the upper diaphragm surface will shift the latter from seat 34, the fuel enters the float bowl through passages 35. When the level is elevated adequately float 12 rises and seats ball valve 38 against port 39. Full fuel inlet pressure is then restored through diaphragm restriction 30 on the lower, control chamber side of the diaphragm. The diaphragm then seats and terminates fuel flow.

Under all conditions and regardless of the inlet pressure, whether high or low, there is always a differential of load in the closing direction, the force of which is variably controlled by the restrictive throttling action of the diaphragm.

The diaphragm-type modification illustrated in Fig. 3 is represented by a unit 41 which is generally similar to the unit 10 of Fig. 1, differing therefrom mainly in respect to the routing of fuel flow as controlled by the diaphragm. Here the diaphragm, specially designated 42, is clamped between the land 22 surrounding control chamber 20 by means of a special inlet fitting 43 having an offset fuel intake passage 44. A restrictive metering port 45 through the diaphragm is also offset from its diametral center and relative to a downwardly opening valve seat 46 formed on the fitting. Seat 46 communicates with the interior of the bowl 11 through a U-shaped discharge passage 47 in the fitting 43 and boss 15, the passage extending through the clamped margin of diaphragm 42.

In a static, non-flow condition of the system, with the diaphragm 42 sealing seat 46, the fluid pressures exerted on faces L and U of the diaphragm are equal, and net valve seating force equals the pressure of the system times the area of the seat 46, plus the force exerted by coil spring 25.

Upon removal of fluid from float bowl 11, float 12 is repositioned to allow fluid flow past float controlled needle valve 17. A proportionate pressure drop results in chamber 20, under the metering action of restrictive port 45, and when the pressure differential on diaphragm faces L and U become sufficiently great and in the proper direction to adequately compress spring 25, flow occurs past valve seat 46 and through passage 47 to bowl 11. As the level arises in the bowl, needle valve 17 assumes corresponding positions of closure, ultimately causing diaphragm 42 to shut off the high flow circuit completely.

It is seen that the operation of unit 41 of Fig. 3 closely follows that of the unit 10 of Fig. 1. In each instance, the precise fluid level at which the respective diaphragms 42 and 21 commence to allow flow or shut it off is dependent upon the physical dimensions and proportions of the parts, the degree of restrictive action, etc.

The embodiments of the invention illustrated in Figures 4, 5, 6 and 7 operate in common through the agency of a plunger to perform their high pressure control function. The modification of Fig. 4 involves a unit 48 which functions very similarly to the units 10 and 41 of Figs. 1 and 3, with the exception that the slower action of a needle-nosed control plunger thereof, as compared with the action of a flat sealing element, permits a slowing down or dampening of the operation of the unit 48 in response to pressure variations in the system. This assists in reducing pulsation and irregularity of flow.

A compression spring 54 acts downwardly on plunger 51 within the hollow interior 55 of the latter, which, in effect, combines with bore 50 to provide a control chamber. A needle-nosed valve stem 56 on the plunger is thus urged for engagement with an annular seat 57 of a discharge passage 58 opening to the lower part of a float vessel 11. The valve element 56 acts in a fuel inlet intake space or chamber 59 which is communicated by a lateral intake port or passage 60 with the fuel supply system. The plunger bore 50 and control chamber 50, 55 are communicated by a passage 61 in boss 49 with the float controlled needle valve seat 18.

In operation, pressure effective in inlet passage 60 and chamber 59 is transmitted to control chamber 55 through the restrictive leak-by passage 52 represented by the working clearance between plunger 51 and bore 50, and the annular grooving of the plunger at 53. During the static non-flow condition the fluid pressures exerted on the upper face U and the lower face L of plunger 51 are equal, and the fluid valve seating force effective on the plunger equals the system pressure times the area of seat 57, plus the force of predeterminedly compressed spring 54. The compression of spring 54 may be controlled by an abutment plug 62 at its upper end.

Upon removal of fluid from bowl 11, the float 12 is repositioned, with an attendant flow past needle valve seat 18. A proportionate pressure drop results in plunger bore control chamber 50, 55 due to metering action of restriction 52. When the force resulting from the pressure differential on plunger faces U and L is of sufficient magnitude and properly directed to commence unseating of plunger needle element 56 from its seat 57, fluid flows past the latter into bowl 11. Upon a rise of the level in the bowl, needle valve 17 assumes corresponding positions of closure which causes the pressure in control chamber 50, 55 to rebuild proportionately, until needle element 56 of plunger 51 shuts off completely the high circuit flow through seat 57. Again, the exact fluid fuel level at which such shut off and opening take place depends upon physical dimensions and relationships of the parts of the assembly.

As indicated above, the needle characteristic of plunger 51 results in a comparative lengthening of the plunger stroke required in order to vary fuel flow for any given change in conditions, as compared with the relatively abrupt action of a flat faced valve. Thus pressure variations in the system do not operate as rapidly to change flow values, which assists in a large measure in reducing pulsation and irregularity of flow.

In accordance with the embodiment of the invention shown in Fig. 5 a control unit 64 is provided in which a variably regulated supply of fuel to the float bowl 11 takes place under the action of a slidable plunger controlling a passage to the bowl. In this instance the bowl 11 has a laterally extending boss 65 which threadedly receives, internally of bowl 11, a vertically arranged fitting 66 in which the needle valve 17 operates to control the valve seat 18. An outward side extension 67 of the boss is counterbored to provide a space 68 therein which communicates through a passage 68' to the interior of bowl 11.

A special intake fitting 69 extends into the counterbored space 68, being threaded at 70 into the inner bore 71 of boss 65. A centrally apertured nose piece 72 is clamped in the inner end of fitting 69, adjacent the inner extremity of bore 71, the nose piece extending across and in coaxial relation to an inner control chamber 73 at this end of the fitting. An O-ring 74 is compressed by the nose end of fitting 69, thus sealing the assembly in this inner zone. Control chamber 73 is communicated through the central opening 75 of nose piece 72 with a passage 76 leading to needle valve seat 18.

Fitting 69 has a further externally facing pilot bore 77 in axial alignment with the control chamber 73, which bore slidably receives a tubular outer extension 78 of a control plunger member or plug 79. This control plug has an enlarged circular flange 80 which is received with a relatively loose tolerance fit in the control chamber 73 of fitting 69, thus affording the desired restrictive flow path. A predeterminedly compressed coil spring 81 acts between flange 80 and nose piece 72 to urge control plug 79 to the left, as viewed in Fig. 5.

The inner extremity of the bore 77 of fitting 69 is formed to provide a valve seat 82, which is engageable by a compressible seat disk 83 carried on the outer surface of plug flange 80. This controls the flow of fuel past seat 82 from an intake passage 84 in fitting 69 to the hollow interior of the tubular extension 78 of control plug 79, since a lateral port 86 in the plug extension is progressively exposed upon movement of the control plug 79 and seat disk 83 to the right, as viewed in Fig. 5. After shifting a predetermined distance in this direction, the tubular extension 78 progressively uncovers the space 68 communicating with bowl passage 68'. An O-ring 88 seals the fitting 69 in relation to the bowl boss extension 67 to prevent leakage from space 68. Fuel under pressure is supplied to intake passage 84 from the supply line 87 of the system.

In the arrangement of Fig. 5, fuel is supplied under pressure through line 87 to the passage 84, and the pressure is transmitted through an annular port restriction at 89 represented by the relatively loose fit of plug flange 80 in the control chamber 73 of fitting 69. The pressure is applied through chamber 73 and passage 76 to float controlled needle valve 17. In the static non-flow condition the fluid pressures exerted on faces L and R of control plug 79 are equal. The force urging the member against seat 82 is equal to the system pressure times the area of seat 82 plus the force of spring 81.

Upon removal of fluid from float bowl 11 the float 12 is repositioned, allowing fluid flow to occur through the needle valve seat 18. A proportionate pressure drop takes place in control chamber 73 and passage 76, as controlled by the restrictive metering or throttling action at flange restriction 89. When the force resulting from the pressure differential on faces L and R of control plug 79 is of sufficient magnitude and proper direction to begin compression of spring 81, the plug shifts to the right and fluid pressure in passage 84 is transmitted across valve seat 82, thence through port 86, tubular space 85 and into space 68 as the latter is uncovered by the plug extension 78. Float bowl 11 is thus replenished through its intake passage 68'.

In this condition the flow side area T of plug 79 to the left of the flange 80 equals its control side area R. Accordingly the plug 79 assumes a position depending entirely upon the calibration of spring 81 and the net force acting to further unseat the plug to the right. As plug 79 moves to the right, the space 68 is gradually further uncovered. The fluid flow on the flow side of the valve is thus metered at this point, resulting in the maintenance of inlet pressure over the entire left hand area of the valve plug. It is desirable to maintain the left and right hand areas equal or nearly equal for pressure and flow stabilization.

As the fluid level in float vessel 11 rises, needle valve 17 gradually moves up and the pressure in control chamber 73 rises. This diminishes the pressure differential across the plug 79, and it moves to the left and ultimately shuts off the high flow side of the unit at seat 82. However, flow may continue through restriction 89 until needle valve 17 is fully engaged with seat 18. The point at which the high flow portion of the unit becomes operative or inoperative depends upon the size of the annular restriction 89, the characteristics of needle valve 17, the calibration of spring 81, the area proportions of valve plug 79, and the input fluid pressure. The structural arrangement of Fig. 5 is similar to that shown in Figs. 6 and 7, with the exception that provisions are made to maintain equal high flow and control side areas during flow conditions, and to utilize only one seal, i. e., at seat 82 during the time of closure.

Figure 7:
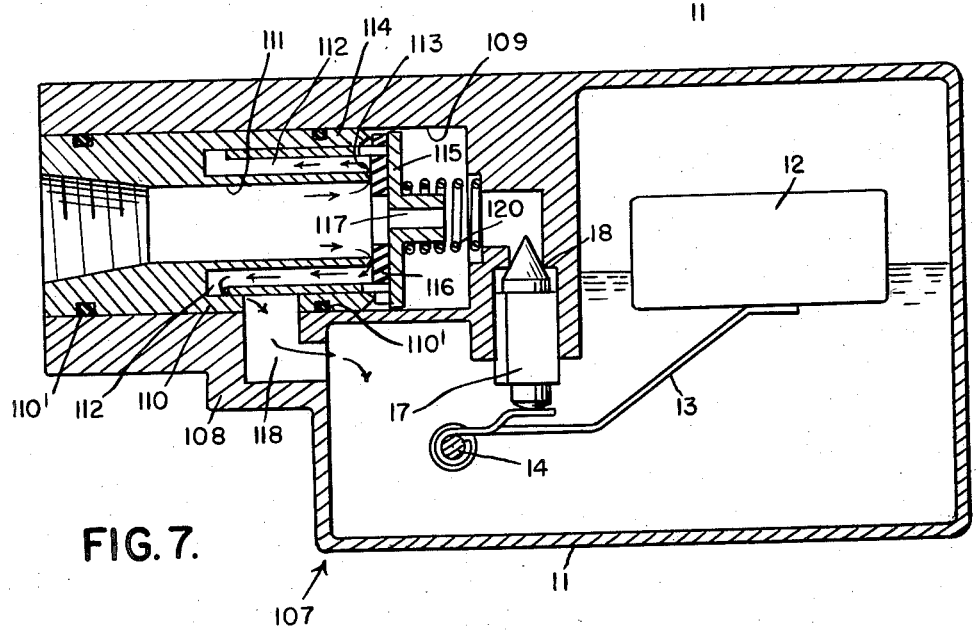

The further modified embodiments of the invention illustrated in Figs. 6 and 7 operate in general accordance with the principles of Fig. 5, with the exception that the fluid passage is rerouted as shown by arrows in Figs. 6 and 7, respectively. This provides a slightly better fuel flow condition while maintaining a stable valve. However in each instance an additional valve seat is required to prevent the fluid level from creeping through the fixed metering restriction of the unit.

As illustrated in Fig. 6, the unit 90 incorporates a special intake fitting 91 threaded into a lateral enlargement or boss 92 of float vessel 11, which fitting has an axial intake passage 93 adapted to discharge through an end valve seat 94. Fitting 91 is sealed at the outer end of its threaded connection by a suitable sealing washer or gasket 91'. The fitting 91 is shaped inwardly of seat 94 to afford an annular flow space 95 which is communicated through a radial inward port 96 in the fitting with a guide bore 97 opening to space 95. This bore slidably receives a tubular control plunger 98 carrying at its outer end a centrally apertured, compressible valve seating disk or washer 99 which is engageable against intake seat 94.

Control plunger 98 has a fixed metering restriction, in this case an orifice 100 in its outer end wall, which communicates through the seat washer 99 with the intake passage 93 of the fitting.

The fitting 91 is provided adjacent its inner extremity with a second annular inwardly facing valve seat 101. This is engageable by an annular seating washer 102 carried by an outwardly flanged end 103 of the tubular control plunger 98. A predeterminedly compressed coil spring 104 acts in the hollow interior of plunger 98, urging the latter for engagement of its seat disk 99 with valve seat 94. The interior of valve plunger 98 opens to an enlarged control chamber 105 which is in communication through a passage 106 with the seat 18 for needle valve 17.

The operation of the unit 90 of Fig. 6 follows that of the unit 64 of Fig. 5. Changes in pressure in chamber 105 attending opening and closing of needle valve 17 are as controlledly metered by restriction 100, and the flow of fluid takes place externally of plunger 98, as indicated by arrows. The seat washer 102 acts against seat 101 to prevent reverse creep of fluid in a static condition of the parts.

The further modified adaptation of Fig. 7 features a unit 107 in which a lateral enlargement of boss 108 of float bowl 11 is drilled to provide a cylindrical bore 109 affording a control chamber. This chamber receives the constant diameter hollow cylindrical fitting 110, with appropriate sealing provisions 110', the innermost bore 111 of which is in communication with system pressure. The fitting 110 is machined annularly to provide an annular fluid flow chamber 112 externally of a valve seat 112 at the inner extremity of the fitting.

A cylindrical sleeve-like control plunger 114 is slidably received in chamber 112 and has a circular disk 115 on its inner extremity which carries a valve seat washer 116. Disk member 115 has a central restricted metering aperture 117 which communicates through washer 116 with the internal bore 111 of fitting 110.

The fitting 110 is secured in fixed relation to boss 108 by any appropriate means and a discharge passage 118 from its annular flow chamber 112 leads to the interior of float bowl. Passage 118 is gradually uncovered by plunger 114 upon movement of the latter to the right, which controllably communicates the annular space 112 with the bowl interior.

A coil compression spring 120 in control chamber 109 urges control disk 115 and plunger 114 to the left for engagement with valve seat 113. The action is in accordance with the principle of Figs. 5 and 6, except that the direction of high fluid flow is as indicated by arrows. This takes place when seat 113 is uncovered upon a predetermined pressure differential on opposite sides of disk 115 as controlled by the opening and closing of needle valve 17. Seating washer 116 seals off the fitting 110 at a seat 121 at its outer extremity to prevent the reverse creep of the fluid mentioned in connection with Fig. 6.

The drawing and the foregoing specification constitute a description of the improved control unit in such full, clear, concise and exact terms as to enable any person skilled in the art to practice the invention, the scope of which is indicated by the appended claims.

What we claim as our invention is:

1. A control unit for a carburetion system, comprising a closed fuel receiver, a valve member movably responsive to variations in the content of fuel in said receiver, a flexible diaphragm at least partially defining a control space which is variably pressurized in accordance with the movements of said valve member, said unit having an annular valve seat and said diaphragm having a member to engage and seal said seat and an opening therethrough outwardly of said seat placing said control space in continuous, restricted-flow communication with a source of fuel under pressure, a spring acting on said diaphragm, said unit having a discharge passage connecting the downstream side of said valve seat with said receiver, said control space being communicated with said receiver under the control of said first named valve member and said spring resiliently biasing said diaphragm to assist pressure in said control space in closing said diaphragm member on said valve seat under a force equal to that of said spring plus a differential in pressure-area forces acting on opposite sides of said diaphragm.

2. A control unit for a carburetion system comprising a closed fuel receiver, a valve member in said receiver movably responsive to variations in the content of fuel therein, a flexible diaphragm in said receiver at least partially defining a control space which is variably pressurized in accordance with the movements of said valve member, said unit having an annular valve seat and said diaphragm having a member to engage and seal said seat and an opening therethrough outwardly of said seat placing said control space in continuous, restricted-flow communication with a source of fuel under pressure, a spring acting on said diaphragm, said unit having a discharge passage connecting the downstream side of said valve seat with said receiver, said control space being communicated with said receiver under the control of said first named valve member and said spring resiliently biasing said diaphragm to assist pressure in said control space in closing said diaphragm member on said valve seat under a force equal to that of said spring plus a differential in pressure-area forces acting on opposite sides of said diaphragm.

References Cited in the file of this patent

UNITED STATES PATENTS

| | | |
|---|---|---|
| 226,224 | Demarest | Apr. 6, 1880 |
| 548,977 | Foster | Oct. 29, 1895 |
| 569,841 | Sandillon | Oct. 20, 1896 |
| 752,991 | Miller | Feb. 23, 1904 |
| 1,676,084 | Flagg | July 3, 1928 |
| 2,491,521 | Samiran | Dec. 20, 1949 |
| 2,528,499 | Davies | Nov. 7, 1950 |
| 2,599,498 | Suska | June 3, 1952 |